(12) United States Patent
Berzon et al.

(10) Patent No.: US 7,820,082 B2
(45) Date of Patent: Oct. 26, 2010

(54) METHOD FOR ADDING A THERMOSET OVERMOLD LAYER TO A LENS WITHIN A MOLD

(75) Inventors: Ronald Berzon, Saint Petersburg, FL (US); Xu Chen, Saint Petersburg, FL (US); Hoa Thien Dang, Tampa, FL (US); Ronald Harmon, Clearwater, FL (US); Matthew James Lockwood, Palmetto, FL (US); Joey Oliveros Obordo, Seminole, FL (US); Robert Alan Valeri, Tampa, FL (US)

(73) Assignee: Essilor International (Compagne Generale d'Optique), Paris (FR)

( * ) Notice: Subject to any disclaimer, the term of this patent is extended or adjusted under 35 U.S.C. 154(b) by 304 days.

(21) Appl. No.: 11/820,752

(22) Filed: Jun. 20, 2007

(65) Prior Publication Data
US 2008/0317950 A1    Dec. 25, 2008

(51) Int. Cl.
*B05D 5/06* (2006.01)
(52) U.S. Cl. .................................. 264/1.8; 264/328.7
(58) Field of Classification Search ................. 264/1.8, 264/328.7
See application file for complete search history.

(56) References Cited

U.S. PATENT DOCUMENTS

| | | | | |
|---|---|---|---|---|
| 2,424,235 A * | 7/1947 | Hoffer | ........................ | 249/53 R |
| 5,523,030 A * | 6/1996 | Kingsbury | .................. | 264/1.7 |
| 5,531,940 A | 7/1996 | Gupta et al. | | |
| 5,658,672 A * | 8/1997 | Lenke et al. | ............. | 428/423.1 |
| 5,943,957 A | 8/1999 | Mason | | |
| 6,180,043 B1 | 1/2001 | Yonemochi et al. | | |
| 6,290,882 B1 * | 9/2001 | Maus et al. | .................. | 264/2.2 |
| 6,367,930 B1 | 4/2002 | Santelices et al. | | |
| 6,416,690 B1 * | 7/2002 | Soane et al. | .................. | 264/1.7 |
| 6,676,877 B2 | 1/2004 | Thompson | | |
| 6,863,848 B2 * | 3/2005 | Engardio et al. | ........... | 264/1.36 |
| 7,077,985 B2 | 7/2006 | Maki et al. | | |
| 7,332,110 B2 * | 2/2008 | Inoue et al. | ................. | 264/1.32 |
| 2002/0039656 A1 * | 4/2002 | McBain et al. | .............. | 428/412 |

(Continued)

FOREIGN PATENT DOCUMENTS

GB    1209303 A    10/1970

(Continued)

OTHER PUBLICATIONS

Sigma-Aldrich, Cobalt Naphthenate, 6 pages, Jan. 2006.

(Continued)

*Primary Examiner*—Joseph S Del Sole
*Assistant Examiner*—Kimberly A Stewart
(74) *Attorney, Agent, or Firm*—Keusey & Associates, P.C.

(57) ABSTRACT

A method and coating used to prepare a photochromically-enabled bifocal ophthalmic lens. The method and equipment includes injection molding a single vision lens, for example, from polycarbonate. The clamp opens vertically and the top insert is exchanged for a bifocal mold having a base curve similar to the single vision lens. The thermoset coating includes compounds from several acrylate classes, and is applied to the single vision lens. The coating may include a photochromic dye. The coating is also formulated to receive a photochromic solution through an imbibition process.

32 Claims, 4 Drawing Sheets

U.S. PATENT DOCUMENTS

| | | | |
|---|---|---|---|
| 2003/0077425 A1 | 4/2003 | McBain et al. | |
| 2003/0082344 A1 | 5/2003 | Straus et al. | |
| 2003/0099809 A1 | 5/2003 | Straus et al. | |
| 2003/0142267 A1* | 7/2003 | Gemert et al. | 351/160 R |
| 2003/0152693 A1 | 8/2003 | Su et al. | |
| 2003/0227109 A1 | 12/2003 | Kitamura et al. | |
| 2005/0089630 A1 | 4/2005 | Schlunt et al. | |
| 2006/0118999 A1 | 6/2006 | Cooper et al. | |
| 2006/0151911 A1 | 7/2006 | Zollner et al. | |
| 2007/0001327 A1* | 1/2007 | Chiu | 264/1.7 |
| 2007/0052922 A1 | 3/2007 | King et al. | |

FOREIGN PATENT DOCUMENTS

| WO | WO0191994 A | 12/2001 |
|---|---|---|
| WO | WO 03/031138 | 4/2003 |
| WO | WO 2004/048068 | 6/2004 |

OTHER PUBLICATIONS

Sigma-Aldrich, Luperox P, 6 pages, Jan. 2006.
Lubrizol Advanced Materials, Inc., Estane Carbothane 3575A, 1 page, Jun. 2007.
Cytec Surface Specialties, Ebecryl 284-N, 2 pages, Jun. 2006.
Cytec Surface Specialties, Ebecryl 1290, 2 pages, May 2006.
Cytec Surface Specialties, Ebecryl 8402, 2 pages, Jun. 2006.
Cytec Surface Specialties, Ebecryl 8411, 2 pages, Aug. 2006.
CVC Specialty Chemicals, Inc., Epalloy 7138, 1 page, Nov. 2004.
Sartomer Company, Inc., SR238, 1 page, Dec. 1998.
Sartomer Company, Inc., SR252, 1 page, Nov. 1998.
Sartomer Company, Inc., SR259, 1 page, Nov. 1998.
Sartomer Company, Inc., SR268, 1 page, Jun. 1997.
Sartomer Company, Inc., SR340, 1 page, Jun. 1997.
Sartomer Company, Inc., SR348, 1 page, Dec. 2001.
Sartomer Company, Inc., SR349, 1 page, Jan. 1999.
Sartomer Company, Inc., SR399, 1 page, Nov. 1998.
Sartomer Company, Inc., SR506, 1 page, Dec. 1998.
Sartomer Company, Inc., SR603, 1 page, Dec. 1998.
Sartomer Company, Inc., SR740, 1 page, Feb. 2006.
Sartomer Company, Inc., CD540, 1 page, Oct. 1998.
Sartomer Company, Inc., CD541, 1 page, Oct. 1998.
Sartomer Company, Inc., CD542, 1 page, Oct. 1998.
Sartomer Company, Inc., CN146, 1 page, Jul. 2003.
Sartomer Company, Inc., CN965, 1 page, Aug. 2003.
Sartomer Company, Inc., CN991, 1 page, Mar. 2004.
Sartomer Company, Inc., CN2258, 1 page, Aug. 2003.
Sartomer Company, Inc., CN2259, 1 page, Aug. 2003.
Sartomer Company, Inc., CN2300, 1 page, Mar. 2006.
Sartomer Company, Inc., CN2301, 1 page, Apr. 2006.
Sartomer Company, Inc., CN2302, 1 page, Mar. 2006.
Ciba Specialty Chemicals, Inc., EFKA 3034, 2 pages, May 2005.

* cited by examiner

METHOD FOR ADDING A THERMOSET OVERMOLD LAYER TO A LENS WITHIN A MOLD

BACKGROUND OF THE INVENTION

1. Field of the Invention

The invention relates to manufacturing a thermoplastic lens, by adding a thermoset-based functional or optical element directly onto the surface of an injected molded ophthalmic lens while it is still in the mold.

2. The Prior Art

In-situ coating via direct injection, so called in-mold coating, has been successfully used in other industries such as automotive, construction, office products and outdoor equipment industries. It was originally developed to improve the surface appearance of sheet molding compound (SMC) parts molded by compression molding. In more recent years it's been applied to injection molded thermoplastic parts.

U.S. Patent Application Publication 2003/0227109 refers to a process for compressive decoration molding applied to the exterior of an injection molded box. The resulting decorative film is a coating along the top and sides of the box, that is, on surfaces perpendicular to the mold parting line. The high viscosity opaque coating is compressed at a controlled rate to provide uniform thickness on all part surfaces. The publication is directed to solving a problem of specific product configuration and does not relate to forming ophthalmic lenses which require optical clarity and varying thickness.

U.S. Patent Application Publication 2006/0151911 describes an injection molded part that is coated with a lacquer layer. The lacquer is injected under pressure into a closed mold that is treated with a mold release agent. Solvent free lacquers with short shelf lives are prescribed by through implementation of a reaction injection molding (RIM) process. The injected lacquer is cured at an elevated pressure, whereby the coating expands and then shrinks, making it difficult to control final coating thickness.

U.S. Patent Application Publication 2005/0089630 describes a lens made by a first process which is then gasketed to receive a surface cast layer. The original lens must be cleaned and dried in order to apply a tie coating before gasketing. The tie coating is also subject to a pre-cure to partially polymerize the coating to improve it ability to tie the original lens to the cast layer. The described compositions and methods suffer from complexity and too many steps.

U.S. Patent Application Publication 2006/0118999 describes a simultaneous molding/overmolding technique utilizing a reversibly engageable rotatable core having identical molds on multiple sides. The technique is designed to allow the molding process to occur on one core side at the same time as the overmolding process takes place on another core side. The parallel molds are not well suited for producing articles of optical quality because the hardware configuration does not allow for interchangeable mold inserts that are needed to produce lenses having different base curves. In addition, since one clamp is used to close both parallel molds, there is only a single clamp force profile which represents a compromise between the two distinct types of molding operations.

U.S. Pat. No. 7,077,985 describes a film insert molding process for adding photochromic or polarizing functionality to an injection molded lens. The functional film is sandwiched between two protective polymeric layers and pre-shaped before being placed into the bifocal injection mold cavity. The preparation of the film involves multiple steps and requires additional resources to keep the film inventory clean prior to use.

This closed mold method of in-mold coating has an advantage, in that the coating is able to cure at the same time as the part is cooling. Since access to the part is limited by the closed mold, all of these systems introduce the coating at the top of the mold cavity with the coating injector being located near the parting line. The preferred molding machine configurations having a vertical parting line, with the movable mold half being reciprocated in a horizontal direction. An example of such machine configuration can be readily seen in U.S. Pat. No. 6,180,043. This patent is concerned with high gloss, opaque coatings, containing as much as 30% and up to 45% titanium dioxide and other pigments. Clearly, for such coatings in which one sees only a highly reflective outer surface, there is no requirement for uniformity or transparency, as with an optical coating. In addition, mold cleanliness and contamination are not issues due to the higher viscosity of pigmented coatings. U.S. Pat. No. 6,180,043 utilizes multistage declining clamping force during the coating cure stage, while WO 03/031138 utilizes multistage declining clamping force during the plastic injection stage.

The remaining closed mold patents describe various molding machine modifications to contain the coating within the mold cavity. U.S. Pat. No. 6,676,877 provides a coating containment shroud along the runner passageway to prevent coating solution from contaminating the liquid resin in the screw. The International Publication WO 2004/048068 relates to retrofitting existing molds for use with an in-mold coating system. Published U.S. Patent Application 2003/0077425, Published U.S. Patent Application 2003/0082344 (corresponding to International Publication WO 03/035354), and Published U.S. Patent Application 2003/0099809 all relate to the addition of a rim feature on the molded item, to seal the parting line and prevent coating solution leakage. While these solutions are adequate for center-gated automobile parts, they are unsuitable for the exacting quality requirements and product configuration of edge-gated optical lenses.

U.S. Pat. No. 5,943,957 discloses a method for pad printing inked images onto injection-molded pieces while they are still in the mold. The patented method relates to conventional ink that air dries, and does not involve an optical grade coating that will be spread over the lens by re-clamping the mold inserts and allowing the coating to cure via the retained heat in the mold block. Published U.S. Patent Application 2003/0152693 discloses pad printing of lenses, but applies a UV or microwave curable coating on cast lenses which are totally divorced from any mold contact.

The present invention provides equipment, methods and formulation to apply an overmold layer on the surface of an ophthalmic lens while it is still in the mold. The overmold layer is thermally cured by the heat from the mold and the residual heat from the thermoplastic lens and results in a photochromic bifocal lens.

SUMMARY OF THE INVENTION

It is an object of the present invention to provide an overmold layer on an injection molded ophthalmic lens by taking advantage of a horizontally-oriented parting line in which the mold opens and closes vertically.

It is a further object to overmold a segmented lens having a photochromically enabled surface.

It is another object to present a coating formulation that includes several classes of acrylate materials.

These and other related objects according to the invention are presented in a method for forming a photochromically-enabled bifocal overmold layer on an optical lens injection molding machine having a vertical equipment axis. Initially, we inject molten thermoplastic resin into an edge-gated lens-forming cavity. The mold is opened at a time when a single vision (SV) lens is rigid enough to maintain its shape while being retained on the lower mold half. The SV upper mold half is swapped out. A bifocal upper mold half having a base curve closely matched to the SV lens is swapped in. An unpressurized full metered charge of a photochromically-enabled thermoset composition is deposited on to the upwardly-facing convex surface of the SV lens. The bifocal upper mold half is then clamped down to form a bifocal overmold lens cavity. The injecting step includes injecting molten resin through a receiver that (i) surrounds an exchangeable SV lens forming insert that can be height adjusted below the parting line in a direction parallel to the vertical equipment axis and (ii) includes a bore for an ejector pin that reciprocates parallel to the vertical equipment axis. The resin may be polycarbonate, for example.

The depositing step may occur simultaneously with one of the swapping steps. The overmold material includes a thermoset composition having two different functional types of acrylates. Swapping includes a horizontal translation of the respective upper mold halves. To complete the overmolding step, the bifocal upper mold half is clamped to the lower mold half, whereby the thermoset composition forms a photochromically-enabled bifocal overmold containing a (meth)acrylate and a metal salt that is intimately formed on the thermoplastic SV lens. The bifocal upper mold half is opened in a vertical direction after the thermoset composition is at least partially thermally cured. The ejector pin slides parallel to the vertical equipment axis to release the lens from the lower mold half The thermoset composition contains about 1% to 5% by weight of a photochromic dye, wherein a resulting segmented lens has good solvent resistance, a % T initial of at least 75% and a % T dark in the range of about 15 to 40%. Alternatively, the composition may be an imbibable material, so that after the lens is released from the lower mold half, the bifocal overmold layer is contacted with a solution containing a photochromic dye in a separate imbibition process.

Generally, the thermoset composition comprises a blend of acrylates from several classes. Basically it includes (1) a monofunctional (meth)acrylate; (2) a multifunctional (meth)acrylate; (3) a metal salt; (4) an initiator; and (5) at least one further compound selected from the group consisting of: (a) difunctional meth(acrylate); (b) a polyester acrylate oligomer; (c) an epoxy modified bisphenol A epoxy; and (d) an aliphatic urethane diacrylate. The composition may optionally include a surfactant. The composition may optionally include a photochromic dye. If included, the photochromic dye is present in an amount between about 1% to 5% by weight, and preferably in an amount of about 3% by weight.

One embodiment of the composition according to the invention includes (1) a monofunctional (meth)acrylate; (2) a multifunctional (meth)acrylate, for a multifunctional hexaacrylate, a multifunctional pentaacrylate, or combinations thereof; (3) a metal salt; (4) an initiator; (5) a difunctional (meth)acrylate; and (6) an aliphatic urethane diacrylate.

Another embodiment according the invention includes (1) a monofunctional (meth)acrylate; (2) a multifunctional (meth)acrylate comprising a multifunctional hexaacrylate; (3) a metal salt; (4) an initiator; (5) a difunctional (meth) acrylate; (6) a polyester acrylate oligomer; and (7) an aliphatic urethane diacrylate comprising an aliphatic polyester based urethane oligomer.

A further embodiment according to the invention includes (1) a monofunctional (meth)acrylate; (2) a multifunctional (meth)acrylate comprising a multifunctional pentaacrylate; (3) a metal salt; (4) an initiator; and (5) a polyester acrylate oligomer; and (6) an aliphatic urethane diacrylate comprising an aliphatic polyester based urethane oligomer.

The composition may include a first monofunctional (meth)acrylate and a second monofunctional (meth)acrylate different from said first monofunctional (meth)acrylate. The monofunctional (meth)acrylate may include an isobornyl acrylate, a hydroxypropyl methacrylate, a 2-phenoxyethyl methacrylate, or combinations thereof. The composition may include a first aliphatic urethane diacrylate and a second aliphatic urethane diacrylate different from the first aliphatic urethane diacrylate. The multifunctional (meth)acrylate may include a dipentaerythritol hexaacrylate, a dipentaerythritol pentaacrylate, a hexafunctional aliphatic urethane acrylate or combinations thereof. The difunctional (meth)acrylate may include a 1,6-hexanediol diacrylate, an ethoxylated bisphenol A di(meth)acrylate, a polyethylene glycol di(meth)acrylate or combinations thereof.

The monofunctional (meth)acrylate is present in an amount of about 1% to 40% by weight, preferably 10 to 20%. The multifunctional (meth)acrylate is present in an amount of about 1% to 50% by weight, preferably 10 to 35%. The metal salt is present in an amount of about 0.05 to 2.0 phm, and the initiator is present in an amount of about 0.1 to 5.0 phm. The difunctional meth(acrylate) is present in an amount of about 0% to 50% by weight, and preferably 5 to 35%. The polyester acrylate oligomer is present in an amount of about 0% to 50% by weight, and preferably 20 to 40%. The epoxy modified bisphenol A epoxy is present in an amount of about 0% to 20% by weight. The aliphatic urethane diacrylate is present in an amount of about 0% to 60% by weight, and preferably 30 to 50%. The metal salt is cobalt naphthenate, for example. The initiator is tert-butylperoxybenzoate, for example.

BRIEF DESCRIPTION OF THE DRAWINGS

The advantages, nature, and various additional features of the invention will appear more fully upon consideration of the illustrative embodiments now to be described in detail in connection with accompanying drawings. In the drawings wherein like reference numerals denote similar components throughout the views.

DETAILED DESCRIPTION OF THE PREFERRED EMBODIMENT

Thermoplastic lenses must be extremely clean before they can be coated. If a lens experiences any delay before being coated, it must undergo an involved cleaning process, which adds to the cost of the finished product. Accordingly, it would be desirable to coat a lens soon after it is formed by injection molding.

In summary, after a plastic lens is formed, a photochromically-enabled thermoset coating is deposited on the convex surface while a bifocal mold insert is swapped in to perform an overmolding step.

Equipment Configuration

For the invention, there are two molds. In general, a mold comprises two mold halves that close together to define a cavity therebetween. The first mold is an injection mold, designed to be held closed with a multi-ton, up to 100 or 150 tons, clamp. Molten thermoplastic is injected into the cavity under high pressure. The second mold is an overmold, which closes after a thermoset resin has been deposited at a location that will be inside the eventual overmold cavity.

Figure 1:
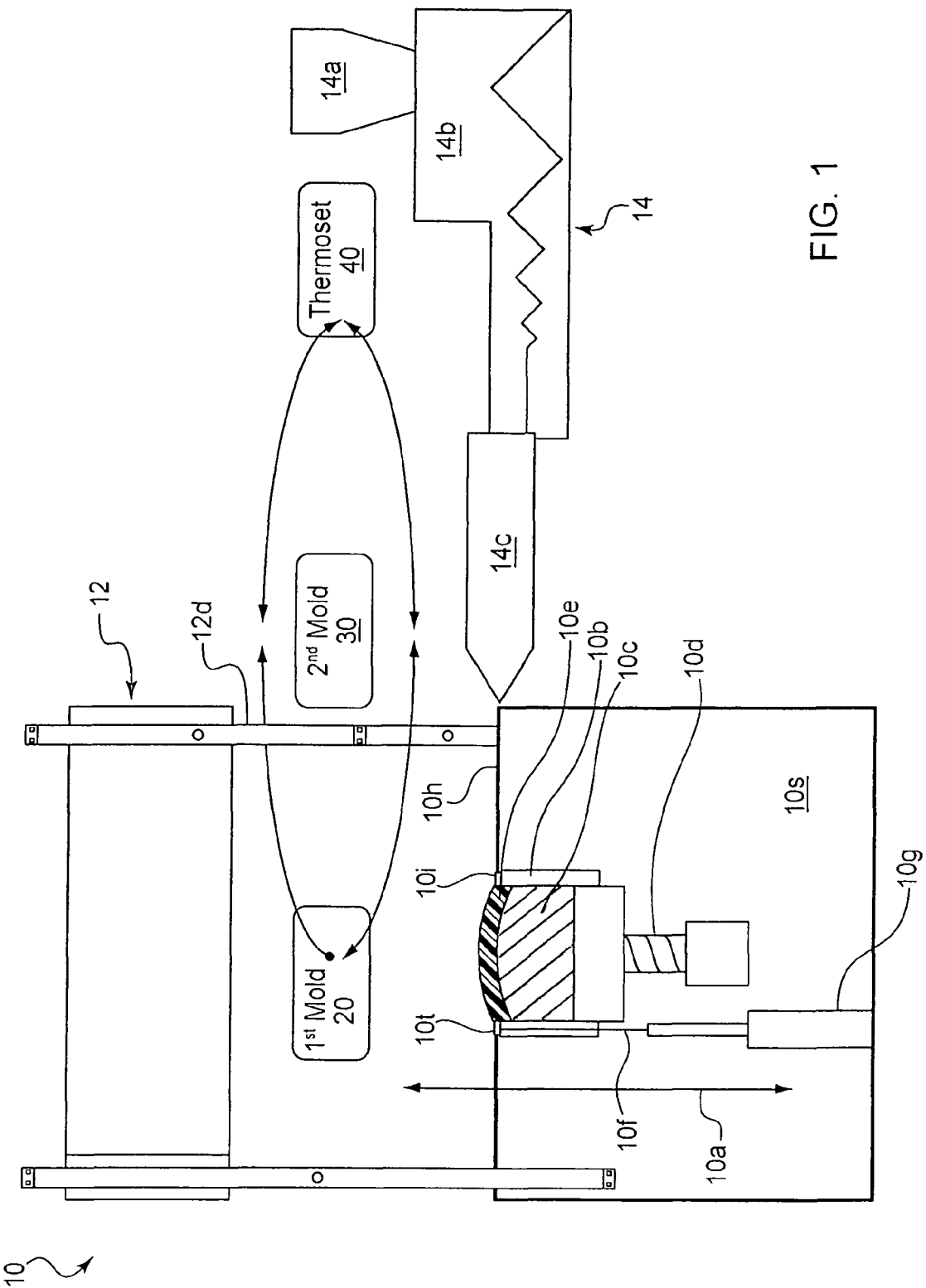
FIG. 1 is a schematic drawing showing an embodiment of fixed and movable mold components.

In one embodiment, certain molding equipment, referred to as the common molding equipment, may be used in both the injection molding operation and the overmolding operation. An example of this is shown schematically in FIG. 1. An injection molding machine 10 is shown with a vertical equipment axis 10a. In this vertical axis embodiment, the mold has a horizontal parting line, where a clamping unit 12 brings the movable mold half 20 ($1^{st}$ Injection Mold) up and down. Optical lens molds are equipped with a receiver 10b that surrounds a mold insert 10c. Precision height adjustment of the mold inserts is obtained by a screw jack 10d. Receiver 10b and mold insert 10c collectively define the lower sides and bottom of a lens-forming cavity 10e. Beyond the lens periphery there is provided one or more sections that form tabs 10t integral with the lens. The tabs may be located in cut-outs at the top end of receiver 10b. In alignment with the cut-outs, the receiver has bores to accommodate an ejector pin 10f. Pins 10f can be raised and lowered by an ejector pin actuator 10g, for example a piston-cylinder unit. At the end of the molding/overmolding cycle, actuator 10g raises pins 10f to eject the lens from cavity 10e.

Thermoplastic is delivered in a molten state by resin system 14. Pellets are fed from a hopper 14a into a heated screw 14b that mixes and compresses the pellets for delivery to the injection molding machine via a runner 10h. The screw may reciprocate in addition to rotating. For example, during rotation the screw is withdrawn to meter a charge at its front end. The screw is then driven forward to deliver the shot. Runner 10h is disposed along the parting line and may include either hot or cold runner systems. The runner terminates at a gate 10i that opens into the cavity. For lenses, this is configured as an edge gate. Though a single molding cavity is shown here for the sake of clarity, it is possible to equip the mold with 2 or more cavities, typically arranged in pairs. In this case, each cavity would be equipped with a receiver, an edge gate, an insert, a screw jack and ejector pins.

For the equipment to switch over from injection molding to overmolding, there is a common equipment grouping and a rotating equipment grouping. The common equipment grouping includes stationary mold half 10s and clamping unit 12. The rotating equipment grouping includes the movable mold half 20, the overmold half 30 and a thermoset applicator 40. The equipment can then alternate between an injection molding configuration and an overmolding configuration. To perform the switch-over, the $1^{st}$ mold 20 is removed from the moving side of clamping unit 12 and replaced with $2^{nd}$ mold 30. To start the next new cycle, $1^{st}$ mold 20 is exchanged back into the clamping unit.

Figure 2:
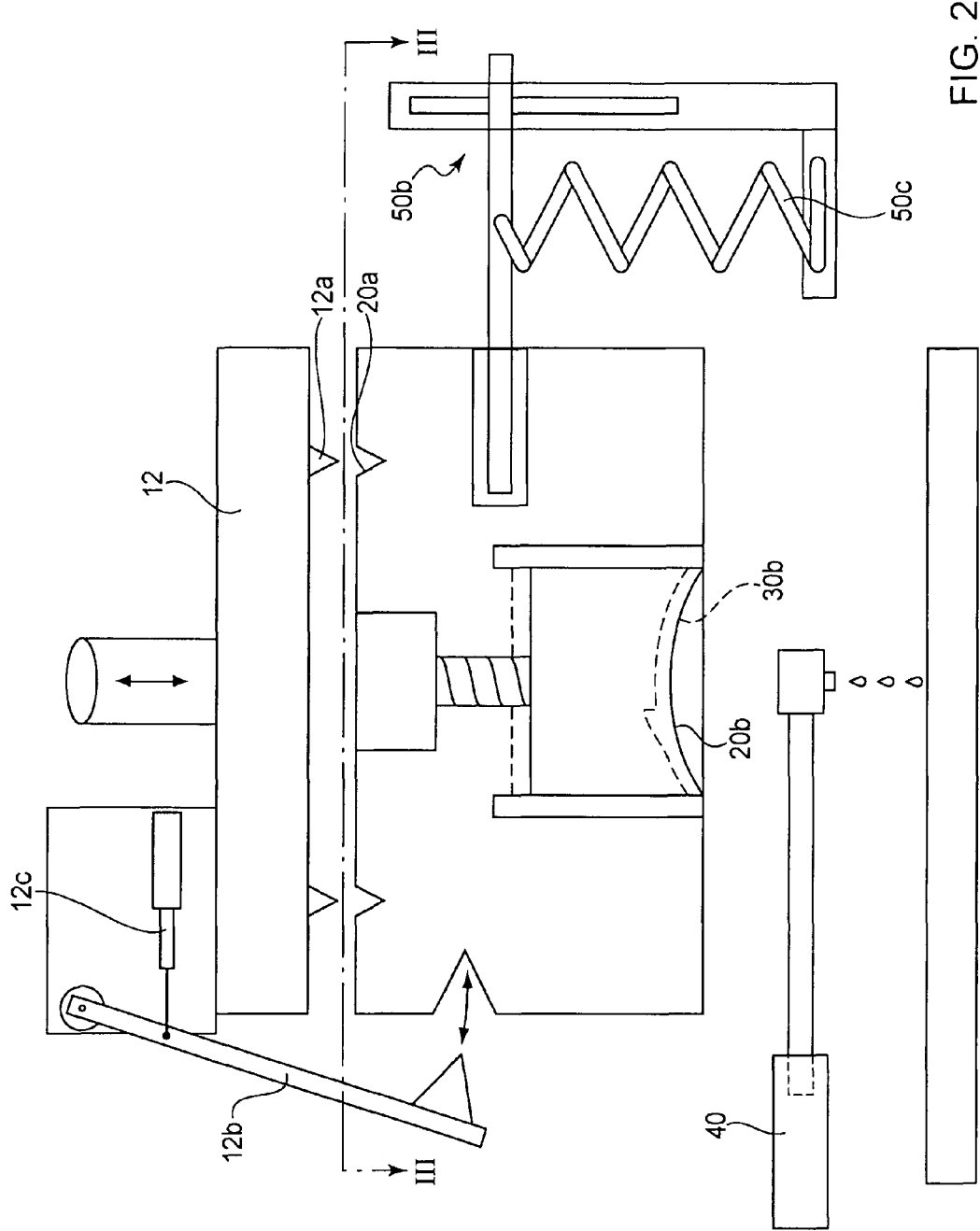
FIG. 2 is a schematic drawing showing comparative height of the moveable mold insert for the respective injection molding and overmolding steps.

The overmolding configuration includes a thermoset application 40 which deposits a photochromically-enabled thermoset formulation onto the injection molded lens. To reduce cycle time, the thermoset may be deposited while the $1^{st}$ mold half 20 is being swapped out. As another example, the thermoset may be deposited while the $2^{nd}$ overmold half 30 is being swappped in. As shown in FIG. 2, thermoset applicator 40 may be disposed in a planar region between upper and lower mold halves. An upper mold transport system 50 operates on another planar region. In this manner, applicator 40 can operate independently of the upper mold transfer status. More particularly, transport system 50 may include an arm 50a for each upper mold half. For example, arm 50a may be a common equipment frame, configured for simultaneous horizontal translation of the two movable mold halves 20 and 30. The arm has a section that can be raised and lowered by a fork lift type mechanism 50b. Upper mold half can be brought into general position within clamping unit 12 and then raised to engage centering pins 12a. When fully raised and centered, retention clips 12b can be locked in place via a clip actuator 12c. Once the upper mold half is secure, lift 50b can depressurized in the case of a pneumatic or hydraulic lift. Upper mold half is then free to travel with clamp 12. At the same time, the other upper mold half may be tracking the same motion path as the in-use mold. A stabilizer 50c, for example, a weight balancing spring may be provided to support the weight of the mold.

Figure 3:
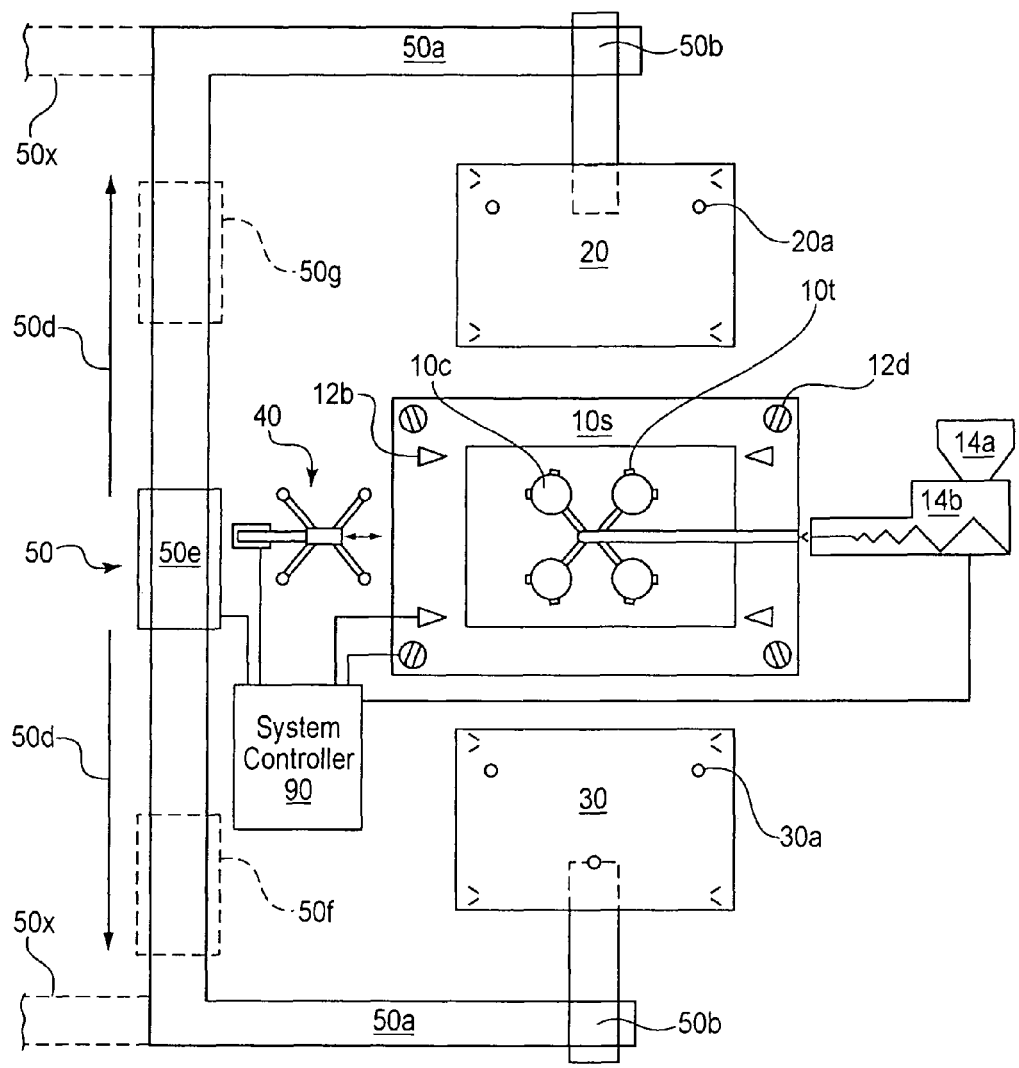
FIG. 3 is a schematic plan view of an equipment configuration according to a practical industrial embodiment of the invention.

To schematically illustrate a floorplan according to the present embodiment, reference is made to FIG. 3. This is a plan view of lower stationary mold half 10s showing a four cavity mold fed by screw 14b. Near the edge of mold 10s, there are the lower portions of the clamping unit's guide posts 12d and retention clips 12b. To the left of the mold is the thermoset applicator 40. The applicator includes a fixed array of deposit heads, that can be fed by one or more reservoirs. Applicator 40 can extend over the mold inserts and simultaneously deposit the photochromically-enabled thermoset liquid on all inserts or lenses. At the same time, the upper molds can be undergoing their horizontal translation, as indicated by arrows 50d.

A transport sled 50e may be moved to the injection molding location 50f, thereby bringing movable mold half 20 into the clamping unit. When centering holes 20a are aligned with centering pins 12a, mold half 20 can be locked to the clamping unit with retention clips 12b. After the injection molding is completed mold half 20 is removed, and transport sled 50e can be moved to the overmolding location 50g. When centering holes 30a are aligned with centering pins 12a, mold half 30 can be locked to the clamping unit with retention clips 12b. During installation of mold half 30, applicator 40 can independently move over the lenses and deposit the charge of thermoset liquid. The operation of clamping unit 12, resin system 14, applicator 40 and mold transport system 50 may be sequenced by a system controller 90. For added efficiency, arms 50x and 50y may carry additional upper mold halves to operate a further station on the left side.

As can be seen, the common equipment grouping is utilized for two sequenced operations, thereby saving space and capital expenditure. It should be noted that clamping unit 12 may operate under different clamp force profiles for the injection molding (IM) step versus the overmolding (OM) step. Other equipment configurations and floor plans may be utilized with the concepts according to the invention. In general, the invention calls for one or more of the following differences when performing the IM versus OM steps.

| Injection Molding | Overmolding |
|---|---|
| High temperature injection | Low Temperature deposit |
| High pressure injection | Low/No pressure deposit |
| Closed Mold Injection | Open Mold Deposit |
| Symmetrical Lens Features | Asymmetrical Lens Features |
| Thermoplastic | Thermoset |
| Optically Clear | Photochromically-enabled |
| SV lens | Bifocal lens |
| Form lens via solidification | Form via polymerization |

Another important distinction, is the mold insert type. As shown in FIG. 2, a single vision (SV) mold insert 20b is shown in solid line. The mold inserts on mold halves 20 and 30 are disposed within receivers and supported by screw jacks just like the lower mold configuration of FIG. 1. Also shown on FIG. 2 is a dotted line representation of a bifocal insert 30b equipped on overmold half 30. Molds 20 and 30 are quite similar to each other, in order to facilitate their interchangeability in the process and system according to the invention. However, mold 30 includes a different mold insert, and its location is set higher within the receiver, to create a new bifocal shaped overmold cavity.

Accordingly, another embodiment of the invention, is a process of injection molding an SV lens, and then overmolding a photochromically-enabled bifocal lens. This process is completely compatible with the equipment configuration and floor plan as shown. Other equipment configurations and floor plans may be used. For example, the stationary and movable mold sides can be in any configuration. The SV lens can be retained on the top mold half, in which case the thermoset liquid would be deposited directly onto a lower bifocal mold insert. Ejector pins need only be provided on one side, that is the SV lens retention side. Different or multiple clamping units may be provided. Two lower mold halves can be shuttled between a common upper mold half. The upper mold half would retain the SV lens and would be equipped with ejector pins.

Process Overview

Figure 4:
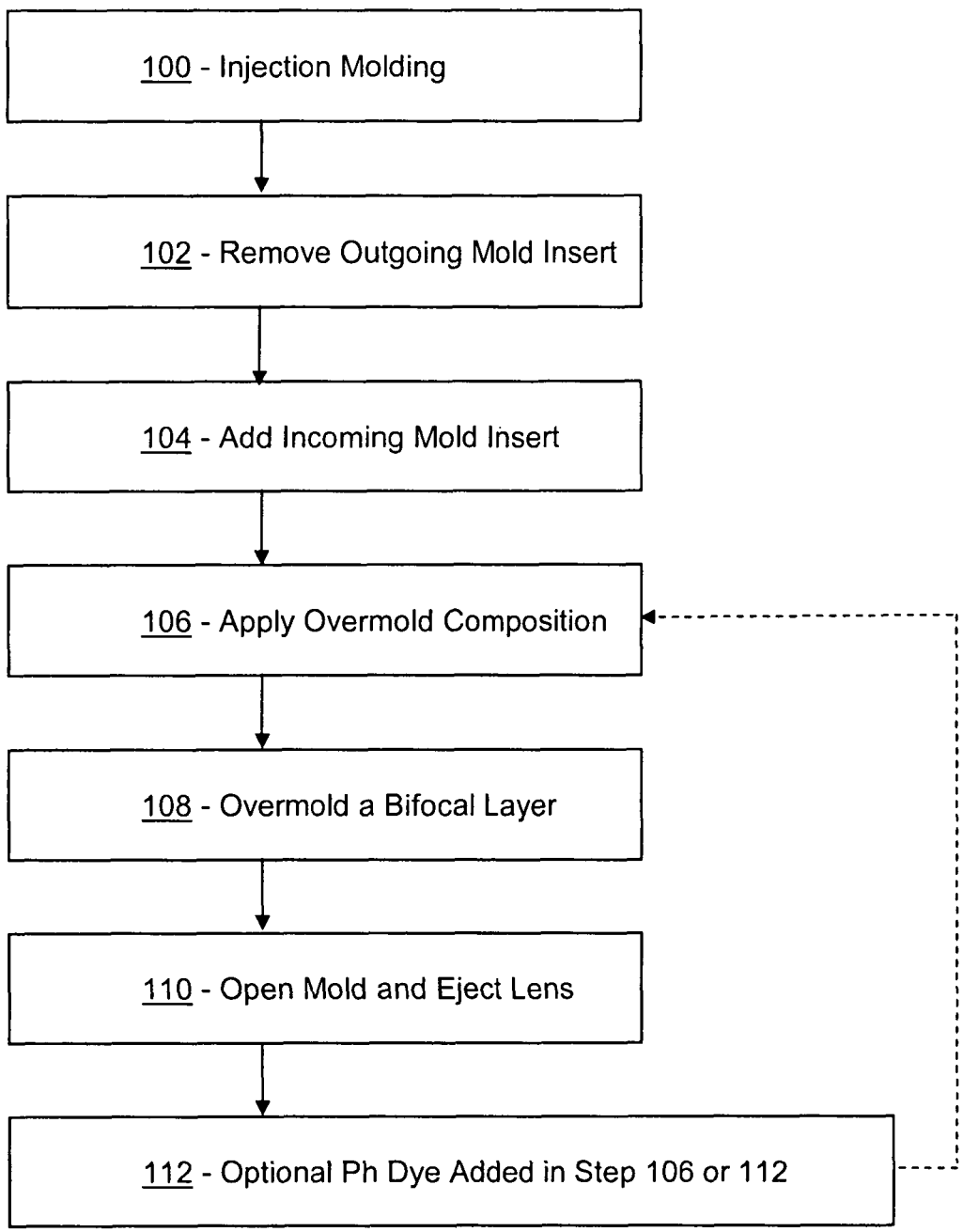
FIG. 4 is a flowchart showing exemplary steps in practicing an embodiment of the invention.

As discussed above, it is possible to have the injection molding lens retained on the upper or lower mold, of an injection molding machine having a horizontal parting line. A generic description of the processes according to the invention is provided in connection with the flowchart of FIG. 4.

100—Injection Molding. A thermoplastic single vision lens is injection molded in a cavity formed by a common mold insert and an outgoing mold insert. The common mold insert is set sufficiently low to retain the lens when the mold is opened. The common mold includes ejector pins.

102—Removing Outgoing Mold Insert. The outgoing mold insert is removed from the common mold insert. Practical examples include horizontal translation away from the fixed injection molding machine.

104—Add Incoming Mold Insert. The incoming mold insert is moved into operative range of the common mold insert. Practical examples include horizontal translation into the fixed injection molding machine.

106—Apply overmold composition. An acrylic-based thermoset composition is deposited onto the lower half of the new bifocal overmold cavity. The composition can be optionally placed onto an insert or onto the lens. The composition can be imbibable or may contain about 1% to 5% photochromic dye. The composition may be applied during steps 102 and/or 104.

108—Overmold a Bifocal Layer. The incoming mold insert and the common mold insert close to thermally cure the thermoset composition so that it forms a layer that is intimately formed on the thermoplastic SV lens. We use the term bifocal to refer generally to a segmented lens, that is a lens having an add corridor. It also includes trifocal lenses.

110—Open mold and Eject lens from Common Mold.

112—Optional Dyeing Step. If an imbibable thermoset composition was utilized, a photochromic dye in solution is brought into contact with it. The solvent is then dried.

The equipment and process according the invention can be employed with proprietary acrylic-based coatings. The intent was to develop a chemistry that could be thermally cured to be used to cast a multi-focal lens onto a finished single vision thermoplastic lens and that could either be imbibed with photochromic dye or that had photochromic dye as part of the base formulation.

Coating Formulations

A polymeric coating formulation was prepared that consisted of organic compounds containing reactive ethylenically unsaturated bonds and consisted of at least one each of a monofunctional, a difunctional, and a multifunctional (meth)acrylate(s), together with an organic peroxide and a catalyst. The chemistry disclosed was thermally cured using tert-butyl peroxybenzoate initiator and cobalt naphthenate catalyst.

To aid in the dissolution and to avoid precipitation of the cobalt naphthenate, a suitable monofunctional acrylate compound was chosen to dissolve this catalyst prior to the addition of the other components. This acrylate can also provide benefit as a reactive diluent to reduce solution viscosity and act as a flow modifier. Acrylates such as isobornyl acrylate, hydroxypropyl methacrylate, benzyl methacrylate or methyl methacrylate can be used for this purpose.

One or more multi-functional acrylates such as dipentaerythritol pentaacrylate or dipentaeytlhritol hexaacrylate were added for scratch and solvent resistance as well as adhesion to polycarbonate.

For the purpose of photochromic dye uptake and coating flexibility, one or more of the following chemistries were incorporated into the coating formulation: polyethyleneglycol acrylates, bisphenyl A acrylates, polyurethane acrylates, polyester acrylates, epoxy acrylates, polyether acrylates, vinyl ethers were incorporated into the coating formulation.

The ingredients of such coatings, their concentrations and photochromic properties are presented below. Table 1A charts ten different formulations. The top rows indicate the type of monofunctional and multifunctional acrylates present in the formulation and bear the label Primary A, meaning Primary acrylate. The middle rows indicate the presence of an initiator designated as Primary I, and the presence of a metal salt designated as Primary M. The bottom rows indicate the type of additional, complementary acrylates that are present in the formulation and are designated as Secondary components. Table 1B is an extension of Table 1A and charts an additional ten different formulations.

TABLE 1A

Formulations

| Component | Example | | | | | | | | | | Key |
|---|---|---|---|---|---|---|---|---|---|---|---|
| | 1 | 2 | 3 | 4 | 5 | 6 | 7 | 8 | 9 | 10 | |
| Monofunctional (meth)acrylate | IBOA | IBOA | IBOA | IBOA | IBOA + HPMA | IBOA + HPMA | IBOA + HPMA | IBOA + HPMA | SR340 | SR340 | Primary A |
| Multifunctional (meth)acrylate | none | Dipenta erythritol Hexaacrylate | Dipenta erythritol Hexaacrylate | Dipenta erythritol Hexa-acrylate | EB1290 | EB1290 | EB1290 | EB1290 | SR399 | SR399 | Primary A |
| t-butyl peroxybenzoate | LP | LP | LP | LP | LP | LP | LP | LP | LP | LP | Primary I |
| Co naphtenate | NF | NF | NF | NF | NF | NF | NF | NF | NF | NF | Primary M |
| Difunctional (meth)acrylate | SR238 | SR349 | SR349 | SR349 | none | none | none | SR268 | NS140 | none | Secondary |
| Polyester acrylate oligomer | CN2259 | CN2258 | CN 2259 | CN 2259 | none | none | none | none | none | CN2300 | Secondary |
| Epoxy BPA epoxy | EP7138 | EP7138 | none | none | none | none | none | none | none | none | Secondary |
| Aliphatic Urethane Diacrylate | CN991 | CN991 | CN991 | CN991 | EB284N + EB8411 | EB284N + EB588N | EB8402 + EB284N | EB284N | CN965 | CN965 | Secondary |

TABLE 1B

Formulations

| Component | Example | | | | | | | | | | Key |
|---|---|---|---|---|---|---|---|---|---|---|---|
| | 11 | 12 | 13 | 14 | 15 | 16 | 17 | 18 | 19 | 20 | |
| Monofunctional (meth)acrylate | SR340 | SR340 | SR340 | SR340 | SR340 | SR340 | SR340 | SR340 | SR340 | SR340 | Primary A |
| Multifunctional (meth)acrylate | SR399 | SR399 | SR399 | SR399 | SR399 | SR399 | SR399 | SR399 | SR399 | SR399 | Primary A |
| t-butyl peroxybenzoate | LP | LP | LP | LP | LP | LP | LP | LP | LP | LP | Primary I |
| Co naphtenate | NF | NF | NF | NF | NF | NF | NF | NF | NF | NF | Primary M |
| Difunctional (meth)acrylate | none | none | SR348 | CD540 | CD541 | CD542 | SR259 | SR603 | SR252 | SR740 | Secondary |
| Polyester acrylate oligomer | CN2301 | CN2302 | none | none | none | none | none | none | None | none | Secondary |
| Epoxy BPA epoxy | none | none | none | none | none | none | none | none | None | none | Secondary |
| Aliphatic Urethane Diacrylate | CN965 | CN965 | CN965 | CN965 | CN965 | CN965 | CN965 | CN965 | CN965 | CN965 | Secondary |

The Primary A category includes monofunctional (meth) acrylates and multifunctional (meth) acrylates. The monofunctional (meth) acrylates that are represented in the table include IBOA, HPMA, an IBOA and HPMA combination, and SR340. IBOA is a generic isobornyl acrylate.

HPMA is a hydroxypropyl methacrylate, containing mixed isomers, available from Aldrich.

SR-340 is the trade name for 2-phenoxyethyl methacrylate, a low volatility monofunctional, aromatic monomer offering good adhesion properties, available from Sartomer Company, Inc. of Exton, Pa. It's molecular diagram is represented as follows:

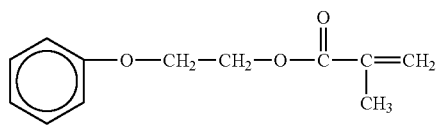

Some of its properties are as follows: Functionality of 1, Inhibitor or 125 HQ ppm; Solvent of 0.1% wt.; Water of 0.2% wt.; Acid of 0.1% wt.; Color of 40 APHA; Specific gravity of 1.079 @ 25 degrees C.; Viscosity of 10 cps at 25 degrees C.; Refractive Index of 1.5109; Surface Tension of 38.2 dynes/cm.; Glass Transition ($T_g$) temperature, of 54 degrees C.; Molecular Weight of 206, and a Boiling point of 260 degrees C. @ 760 mm.

The multifunctional (meth) acrylates that are represented in the table include generic dipentaerythritol hexaacrylate, EB 1290 and SR399.

Ebecryl® 1290 is the trade name for a hexafunctional aliphatic urethane acrylate that exhibits very fast cure response when exposed to ultraviolet light (UV) or electron beam (EB). The product is made from acrylated aliphatic urethane in a range of 50 to 60% combined with acrylated polyol in a range of 40 to 50% by weight. Ebecryl® 1290 is available from Cytec Surface Specialties, Inc. of Smyrna, Ga. Some of its properties are: Color, Gardner scale, max. of 1; Viscosity of 1,800-2,200 cP at 60 degrees C.; Density 1.19 g/ml at 25 degrees C.; Functionality of 6 (a theoretical determination based on the undiluted oligomer); Tensile strength of 6,700 psi; Elongation at break of 2%; Boiling point of >100 degrees C.; Vapor pressure of <0.013 h Pa @ 20 degrees C.; and a Glass Transition temperature of 69 degrees C.

SR-399 is the trade name for dipentaerythritol pentaacrylate available from Sartomer Company, Inc. of Exton, Pa. It's molecular diagram is represented as follows:

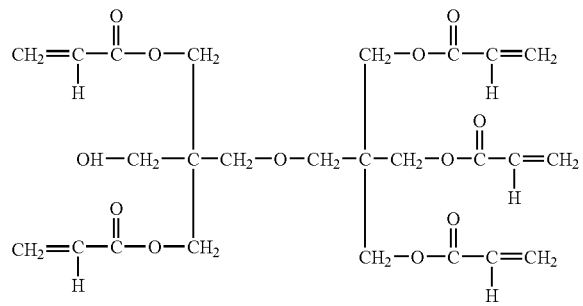

Some of its properties are as follows: Functionality of 5, Inhibitor of 270 MEHQ ppm; Solvent of 0.1% wt.; Water of 0.1% wt.; Acid of 0.1% wt.; Color of 50 APHA; Specific gravity of 1.192 @ 25 degrees C.; Viscosity of 13,600 cps at 25 degrees C.; Refractive Index of 1.4885; Surface Tension of 39.9 dynes/cm.; Glass Transition Temperature, $T_g$ of 90 degrees C.; and a Molecular Weight of 525.

The metal salt may be a generic cobalt naphthenate or Naftolite. In the table, NF represents Naftolite.

Cobalt Naphthenate may be obtained from Sigma-Aldrich located in St. Louis, Mo. It has CAS No. 61789-51-3 and contains up to 10% cobalt, CAS No. 7440-84-4. It is also referred to as Naftolite.

The initiator may be a generic tert-butyl peroxybenzoate or Luperox P. In the table, LP represents Luperox P.

Luperox P is the trade name for tert-butyl peroxybenzoate, 98% available from Sigma-Aldrich of St. Louis, Mo. It has CAS No. 614-45-9 and the formula $C_{11}H_{14}O_3$. It is also referred to as t-butyl perbenzoate, t-butyl peroxy benzoate, Esperox 10, Novox, Trigonox C, and tert-butyl perbenzoate. Some of its properties are as follows: Molecular weight of 194.23 AMU; BP/BP range of 75.0-76.0 degrees C. at 0.2 mmHg; Vapor pressure of 3.36 mmHg at 50 degrees C.; Vapor Density of 6.7 g/l; SG/Density of 1.034 g/cm³; Volatility of 100%; Flash point of 93 degrees C.; and a Refractive Index of 1.496.

The difunctional (meth) acrylates that are represented in the table include SR238, SR349, SR268, NS140, SR348, CD540, CD541, CD542, SR259, SR603, SR252 and SR740.

SR-238 is the trade name for 1,6 hexanediol diacrylate available from Sartomer Company, Inc. of Exton, Pa. It has the following molecular diagram:

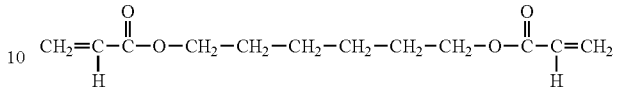

Some of its properties are as follows: Functionality of 2, Inhibitor of 90 HQ ppm; Solvent of 0.1% wt.; Water of 0.2% wt.; Acid of 0.05% wt.; Color of 20 APHA; Specific gravity of 1.020 @ 25 degrees Celsius, Viscosity of 9 cps @ 25 degrees Celsius; Refractive Index of 1.4560; Surface tension of 35.7 dynes/cm; a Glass transition ($T_g$) temperature of 43 degrees Celsius; and a Molecular Weight of 226.

SR-349 is the trade name for ethoxylated (3) bisphenol A diacrylate available from Sartomer Company, Inc. of Exton, Pa. It has the following molecular diagram:

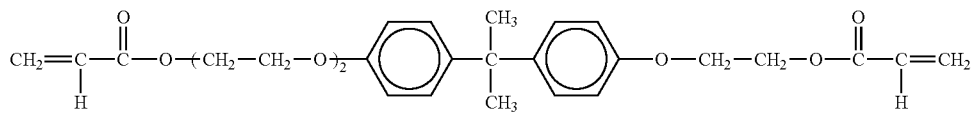

Some of its properties are as follows: Functionality of 2, Inhibitor of 750 HQ ppm; Solvent of 0.1% wt.; Water of 0.1% wt.; Acid of 0.015% wt.; Color of 80 APHA; Specific gravity of 1.145 @ 25 degrees Celsius, Viscosity of 1600 cps @ 25 degrees Celsius; Refractive Index of 1.5425; Surface tension of 43.6 dynes/cm; a Glass transition ($T_g$) temperature of 67 degrees Celsius; Flash Point of 240 degrees Celsius polymerization; and a Molecular Weight of 468.

SR-268 is the trade name for tetraethylene glycol diacrylate available from Sartomer Company, Inc. of Exton, Pa. It has the following molecular diagram:

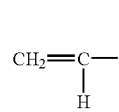 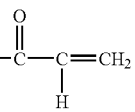

Some of its properties are as follows: Functionality of 2, Inhibitor of 125 HQ ppm and 175 MEHQ ppm; Solvent of 0.1% wt.; Water of 0.2% wt.; Acid of 0.05% wt.; Color of 50 APHA; Specific gravity of 1.114 @ 25 degrees Celsius, Viscosity of 20 cps @ 25 degrees Celsius; Refractive Index of 1.4621; Surface tension of 40.2 dynes/cm; a Glass transition ($T_g$) temperature of 23 degrees Celsius; and a Molecular Weight of 302.

SR-348 is the trade name for ethoxylated (2) bisphenol A dimethacrylate available from Sartomer Company, Inc. of Exton, Pa. It is also known as an ethoxylated (2) bisphenol A dimethacrylate having the following molecular diagram

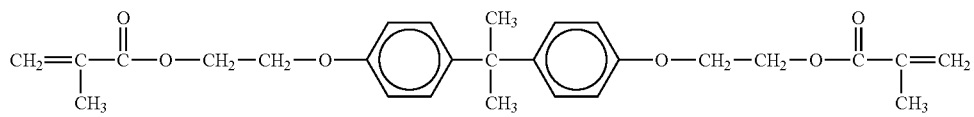

It is a low volatility monomer used in free radical polymerization. Some of its properties are as follows: Functionality of 2, Inhibitor of 340 MEHQ ppm; Solvent of 0.1% wt.; Water of 0.15% wt.; Acid of 0.05% wt.; Color of 2.5 Gardner; Specific gravity of 1.119 @ 25 degrees C.; Viscosity of 1,082 cps at 25 degrees C.; Refractive Index of 1.5424; Suface Tension of 41.0 dynes/cm.; Molecular Weight of 452; and a Flash point of 158-166 polymerization in degrees C.

CD-540 is the trade name of an ethoxylated (4) bisphenol A dimethacrylate available from Sartomer Company, Inc. of Exton, Pa. It has the following molecular diagram

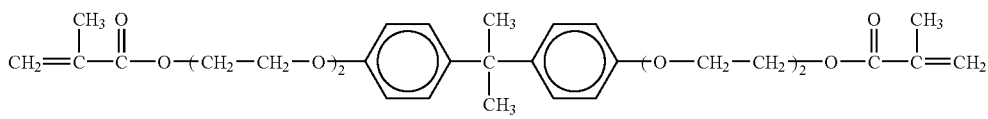

It is a low volatility monomer used in free radical polymerization. Some of its properties are as follows: Functionality of 2, Inhibitor of 190 MEHQ ppm; Solvent of 0.1% wt.; Water of 0.2% wt.; Acid of 0.1% wt.; Color of 100 APHA; Specific gravity of 1.116 @ 25 degrees C.; Viscosity of 555 cps at 25 degrees C.; Refractive Index of 1.5315; Suface Tension of 35.2 dynes/cm.; Glass transition ($T_g$) temperature of 108 degrees C.; and a Molecular Weight of 572.

CD-541 is the trade name of an ethoxylated (6) bisphenol A dimethacrylate available from Sartomer Company, Inc. of Exton, Pa. It has the following molecular diagram

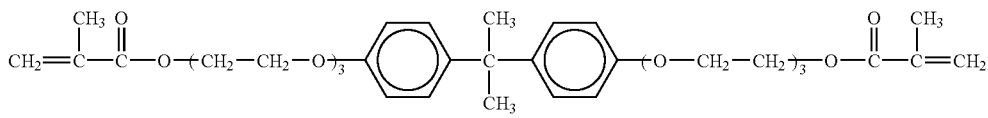

It is a low volatility monomer used in free radical polymerization. It provides a good hydrophobic and hydrophilic balance. It has a hydrophobic backbone for alkali solubility. Some of its properties are as follows: Functionality of 2, Inhibitor of 180 MEHQ ppm; Solvent of 0.1% wt.; Water of 0.2% wt.; Acid of 0.1% wt.; Color of 50 APHA; Specific gravity of 1.118 @ 25 degrees C.; Viscosity of 440 cps at 25 degrees C.; Refractive Index of 1.5227; Suface Tension of 35.3 dynes/cm.; Glass transition ($T_g$) temperature of 54 degrees C.; and a Molecular Weight of 660.

CD-542 is the trade name of an ethoxylated (8) bisphenol A dimethacrylate available from Sartomer Company, Inc. of Exton, Pa. It has the following molecular diagram

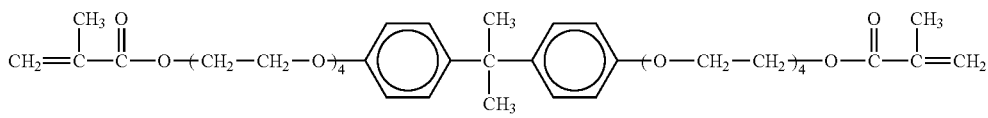

It is a low volatility monomer used in free radical polymerization. It provides a good hydrophobic and hydrophilic balance. It has a hydrophobic backbone for alkali solubility. Some of its properties are as follows: Functionality of 2, Inhibitor of 175 MEHQ ppm; Solvent of 0.1% wt.; Water of 0.2% wt.; Acid of 0.1% wt.; Color of 40 APHA; Specific gravity of 1.119 @ 25 degrees C.; Viscosity of 420 cps at 25 degrees C.; Refractive Index of 1.5147; and a Molecular Weight of 728.

SR-259 is the trade name for polyethylene glycol (200) diacrylate available from Sartomer Company, Inc. of Exton, Pa. It has the following molecular diagram

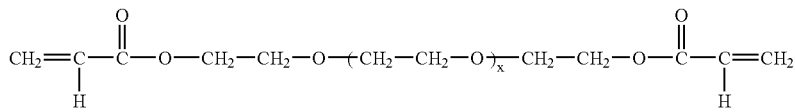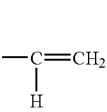

It is a low volatility monomer. Some of its properties are as follows: Functionality of 2, Inhibitor of 750 MEHQ ppm; Solvent of 0.1% wt.; Water of 0.2% wt.; Acid of 0.02% wt.; Color of 60 APHA; Specific gravity of 1.122 @ 25 degrees C.; Viscosity of 25 cps at 25 degrees C.; Refractive Index of 1.4639; Surface tension of 41.3 dynes/cm; and a Molecular Weight of 302.

SR-603 is the trade name for polyethylene glycol (400) dimethacrylate available from Sartomer Company, Inc. of Exton, Pa. It has the following molecular diagram

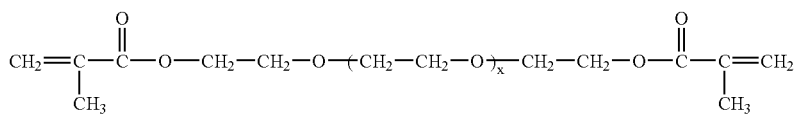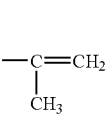

It is a difunctional monomer. Some of its properties are as follows: Functionality of 2, Inhibitor of 245 MEHQ ppm; Solvent of 0.1% wt.; Water of 0.4% wt.; Acid of 0.05% wt.; Color of 100 APHA; Specific gravity of 1.117 @ 25 degrees C.; Viscosity of 85 cps at 25 degrees C.; Refractive Index of 1.4645; Surface tension of 40.0 dynes/cm; a Glass transition ($T_g$) temperature of −21 degrees C.; and a Molecular Weight of 598.

SR-252 is the trade name for polyethylene glycol (600) dimethacrylate available from Sartomer Company, Inc. of Exton, Pa. It has the following molecular diagram

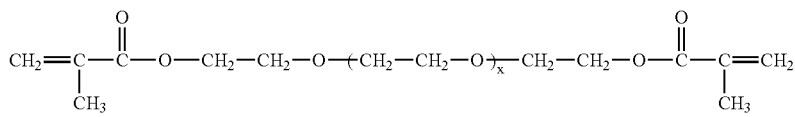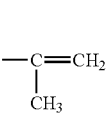

It is a difunctional monomer. Some of its properties are as follows: Functionality of 2, Inhibitor of 1,000 MEHQ ppm; Solvent of 0.1% wt.; Water of 0.5% wt.; Acid of 0.02% wt.; Color of 35 APHA; Specific gravity of 1.101 @ 25 degrees C.; Viscosity of 67 cps at 25 degrees C.; Refractive Index of 1.4655; Surface tension of 41.6 dynes/cm; and a Molecular Weight of 770.

SR740 is the trade name for polyethylene glycol (1000) dimethacrylate available from Sartomer Company, Inc. of Exton, Pa. It is a water-soluble monomer used for peroxide-cure coatings. Some of its properties are as follows: Melting point of 30-32 degrees C.; and a Viscosity of 50 cps at 60 degrees C.

The polyester acrylate oligomers that are represented in the table include CN2258, CN2259, CN2300, CN2301 and CM2302.

CN-2258 is the trade name of an acrylate oligomer. It is an polyester acrylate oligomer available from Sartomer Company, Inc. located in Exton, Pa. Some of its properties are:

Specific gravity of 1.13 @ 25 degrees Celsius; Color of 110 APHA; and a Viscosity of 4,200 cps @ 60 degrees Celsius. It exhibits good abrasion resistance, impact strength and high flexibility.

CN-2259 is the trade name of an acrylate oligomer. It is an polyester acrylate oligomer available from Sartomer Company, Inc. located in Exton, Pa. Some of its properties are: Color of 200 APHA; and a Viscosity of 375 cps @ 70 degrees Celsius. It exhibits good abrasion resistance, hardness, and impact strength as well as a quick cure response and low viscosity.

CN2300 is the trade name for a hyperbranched polyester acrylate available from Sartomer Company, Inc. of Exton, Pa. It is also known as a polyester acrylate oligomer. It has low viscosity and high functionality, along with fast cure response and low shrinkage, which leads to coatings that cure quickly and have good adhesion.

Some of its properties include: Color of 200 APHA; Density of 1.110 g/cm$^3$; Elongation of 5%; Functionality of 5; Modulus of 99,000 psi @ 1%; Refractive Index of 1.466 @ 25 degrees C.; Shrinkage of 9.0+/−0.3%; Surface Tension of 32.6 dyes/cm; Tensile Strength of 5,400 psi; Viscosity of 60 cps @ 60 degrees C. and 600 cps @ 25 degrees C.; and a Glass Transition temperature ($T_g$) of 96.4 degrees C. by DMA.

CN2301 is the trade name for a hyperbranched polyester acrylate oligomer available from Sartomer Company, Inc. of Exton, Pa. It is also known as a polyester acrylate oligomer. It has low viscosity and high acrylate functionality, along with fastest cure response, and best scratch and scuff resistance of the hyperbranched polyester acrylates, which leads to coatings with scratch resistance and excellent adhesion.

Some of its properties include: Color of 200 APHA; Density of 1.150 g/cm$^3$; Elongation of 4%; Functionality of 9; Modulus of 195,000 psi @ 1%; Refractive Index of 1.475 @ 25 degrees C.; Shrinkage of 8.1+/−0.4%; Surface Tension of 38.4 dyes/cm; Tensile Strength of 4,900 psi; Viscosity of 260 cps @ 60 degrees C. and 4,000 cps @ 25 degrees C.; and a Glass Transition temperature ($T_g$) of 77 degrees C. by DMA.

CN2302 is the trade name for a hyperbranched polyester acrylate oligomer available from Sartomer Company, Inc. of Exton, Pa. It is also known as a polyester acrylate oligomer. It has high functionality and the lowest viscosity of the hyperbranched polyester acrylates.

Some of its properties include: Color of 150 APHA; Density of 1.130 g/cm$^3$; Elongation of 9%; Functionality of 16; Modulus of 163,000 psi @ 1%; Refractive Index of 1.475 @ 25 degrees C.; Shrinkage of 9.0+/−0.5%; Surface Tension of 37.8 dyes/cm; Tensile Strength of 7,400 psi; Viscosity of 60 cps @ 60 degrees C. and 300 cps @ 25 degrees C.; and a Glass Transition temperature ($T_g$) of 164.8 degrees C. by DMA.

The epoxy BPA epoxy that is represented in the table includes EP7138.

EPALLOY® 7138 is a low viscosity non-crystallizing modified Bisphenol A Resin, that includes bisphenol A epoxy resin CAS No. 25085-99-8 and bisphenol F epoxy resin CAS No. 28064-14-4. It combines low hydrolyzable chlorides with a high degree of reactivity and good chemical resistance. It is compatible with all standard curatives and most resin systems and solvents. It is available from Specialty Chemicals of Moorestown, N.J. It is excellent for 100% solids coatings and as a base resin for low VOC coatings with higher temperature and chemical resistance versus conventionally diluted resins. Cure speeds are also not reduced like typical low viscosity Bisphenol A resins or those modified with reactive diluents. Some of its typical properties are: Viscosity 5,500-7,500 cps @ 25 degrees C.; Epoxide Equivalent Weight of 175-185 g/eq; Gardner color, max of 1, Residual Epichlorohydrin, max of 10 ppm; Hydrolyzable Chloride, max of 0.10%; Weight per gallon of 9.7+/−0.1 lbs. @ 25 degrees C.; and a Flash point, COC of >250 degrees C.

The aliphatic urethane diacrylates that are represented in the table include CN991, EB284N, EB8411, EB588, EB8402 and CN965.

Ebecryl® 8411 is the trade name for an aliphatic urethane diacrylate diluted 20% by weight with the reactive diluent isobornyl acrylate (IBOA). Ebecryl 8411 and IBOA are available from Cytec Surface Specialties, Inc. of Smyrna, Ga. IBOA has CAS NO. 5888-33-5. Some of the properties of Ebecryl 8411 are: Color, Gardner scale, max. of 1; Viscosity of 3,400-9,500 cP at 65.5 degrees C.; a % NCO, max. of 0.2; Density of 1.13 g/ml at 25 degrees C.; Functionality of 2 (a theoretical determination based on the undiluted oligomer); Oligomer of 80% by weight; Tensile strength of 1,170 psi; Elongation at break of 320%; Young's modulus of 1,280 psi; Boiling point of >100 degrees C.; Vapor pressure of <0.013 h Pa® 20 degrees C.; and a Glass Transition temperature of −18 degrees C.

Ebecryl®& 8402 is the trade name for a low viscosity aliphatic urethane diacrylate available from Cytec Surface Specialties, Inc. of Smyrna, Ga. Some of the properties of Ebecryl 8402 are: Color, Gardner scale, max. of 1; Viscosity of 450-650 cP at 65.5 degrees C. and 15,000 cP at 25 degrees C.; a % NCO, max. of 0.2; Density of 1.12 g/ml at 25 degrees C.; Functionality of 2 (a theoretical determination based on the undiluted oligomer); Oligomer of 100% by weight; Tensile strength of 3,300 psi; Elongation at break of 90%; Young's modulus of 14,000 psi; and a Glass Transition temperature of 14 degrees C.

CN965 is the trade name of an aliphatic polyester based urethane diacrylate oligomer. It is a flexible oligomer available from Sartomer Company, Inc. located in Exton, Pa. Some of its properties are: Color, APHA of 50; Density of 9.144 lbs./gal.; Elongation of 57; Functionality of 2; Modulus of 3040 psi @ 1%; Refractive index 25' of 1.4802; Glass Transition ($T_g$) temperature of −37 degrees C.; and a Viscosity of 9975 cps @ 60 degrees C. It exhibits good adhesion, good chemical resistance, good heat resistance, good water resistance, good weatherability, high abrasion resistance, high flexibility, high impact strength and low shrinkage.

Having now described the generic and trade name components, the following Table 2A charts the amounts of each component corresponding to the ten different formulations from Table 1A. Table 2B is an extension of Table 2A and charts additional amounts corresponding to the ten different formulations from Table 1B.

TABLE 2A

| | PerCent by Weight | | | | | | | | | | |
|---|---|---|---|---|---|---|---|---|---|---|---|
| | Example | | | | | | | | | | Component |
| | 1 | 2 | 3 | 4 | 5 | 6 | 7 | 8 | 9 | 10 | Key |
| Monofunctional (meth)acrylate | 10% | 10% | 10% | 10% | 15.2% | 15.2% | 15.2% | 15.2% | 20% | 20% | Primary A |
| Multifunctional (meth)acrylate | none | 7.5% | 10% | 10% | 31.88% | 31.88% | 31.88% | 31.88% | 20% | 20% | Primary A |
| t-butyl peroxybenzoate | 1 | 1 | 1 | 1 | 1.55 | 1.55 | 1.55 | 1.55 | 1 phm | 1.5 phm | Primary I |
| Co naphtenate | 0.30 | .30 | 0.30 | 0.30 | 0.26 | 0.26 | 0.26 | 0.26 | 0.2 phm | 0.2 phm | Primary M |
| Difunctional (meth)acrylate | 10% | 8.2% | 5.7% | 5.7% | none | none | none | 32.78% | 30% | none | Secondary |
| Polyester acrylate oligomer | 20% | 30% | 30% | 40% | none | none | none | none | none | 30% | Secondary |
| Epoxy BPA epoxy | 18.70% | 10% | none | none | none | none | none | none | none | none | Secondary |
| Aliphatic Urethane Diacrylate | 40% | 30% | 40% | 30% | 49.94% | 49.94% | 49.94% | 17.16% | 30% | 30% | Secondary |

TABLE 2B

| | Percent by Weight Example | | | | | | | | | | Component Key |
|---|---|---|---|---|---|---|---|---|---|---|---|
| | 11 | 12 | 13 | 14 | 15 | 16 | 17 | 18 | 19 | 20 | |
| Monofunctional (meth)acrylate | 20% | 20% | 20% | 20% | 20% | 20% | 20% | 20% | 20% | 20% | Primary A |
| Multifunctional (meth)acrylate | 20% | 20% | 20% | 20% | 20% | 20% | 20% | 20% | 20% | 20% | Primary A |
| T-butyl Peroxybenzoate (phm) | 1.5 phm | 1.5 | 1.5 | 1.5 | 1.5 | 1.5 | 1.5 | 1.5 | 1.5 | 1.5 phm | Primary I |
| Co naphtenate (phm) | 0.2 phm | 0.2 | 0.25 | 0.25 | 0.25 | 0.25 | 0.25 | 0.25 | 0.25 | 0.25 phm | Primary M |
| Difunctional (meth)acrylate | none | none | 30% | 30% | 30% | 30% | 30% | 30% | 30% | 30% | Secondary |
| Polyester acrylate oligomer | 30% | 30% | none | none | none | none | none | none | none | none | Secondary |
| Epoxy BPA epoxy | none | none | none | none | none | none | none | none | none | none | Secondary |
| Aliphatic Urethane Diacrylate | 30% | 30% | 30% | 30% | 30% | 30% | 30% | 30% | 30% | 30% | Secondary |

The following are examples of this invention. The following materials were added in the order specified to a suitable container for mixing and storage.

EXAMPLE #1

1. 10.00 parts of isobornyl acrylate were added to an appropriate container.
2. 0.30 parts of cobalt naphthenate were then added to the isobornyl acrylate and mixed well until completely dissolved.
3. Next, 18.70 parts of an Epoxy novolac modified bisphenol A Epoxy, EPPALOY 7138, were added and mixed in well.
4. Next, 10.00 parts of 1,6 hexanediol Diacrylate, SR-238, were added and mixed in well.
5. Optionally, 3 parts of a mixture of photochromic dyes can be mixed in to the solution.
6. 20.00 parts CN2259, a polyester acrylate oligomer were added and mixed well
7. 40.00 parts of CN991, an aliphatic polyester urethane Diacrylate were added and mixed well.
8. 1 part of tert-butyl peroxybenzoate was added and mixed well
9. The solution is now ready for use or should be refrigerated for use at a later time.

Since the photochromic dye is optional, its weight percentage is not included in the basic 100% formulation.

EXAMPLE #2

1. 10.0 parts of isobornyl acrylate were added to an appropriate container.
2. 0.30 parts of cobalt naphthenate were then added to the isobornyl acrylate and mixed well until completely dissolved.
3. Next, 10.0 parts of EPPALOY 7138, an epoxy novolac modified bisphenol A epoxy were added and mixed well
4. Next, 8.20 parts of an ethoxylated 3 bisphenol A Diacrylate, SR-349, were added and mixed in well.
5. Optionally, 3 parts of a mixture of photochromic dyes can be mixed in to the solution.
6. Next, 7.50 parts of dipentaerythritol hexaacrylate were added and mixed in well.
7. 30.00 parts CN2258, a polyester acrylate oligomer were added and mixed well
8. 30.00 parts of CN991, an aliphatic polyester urethane Diacrylate were added and mixed well.
9. 1 part of tert-butyl peroxybenzoate was added and mixed well
10. The solution is now ready for use or should be refrigerated for use at a later time.

In Examples 2-4, the 3% photochromic dye is included in the total 100%.

EXAMPLE #3

1. 10.00 parts of isobornyl acrylate were added to an appropriate container.
2. 0.30 parts of cobalt naphthenate were then added to the isobornyl acrylate and mixed well until completely dissolved.
3. Next, 5.70 parts of an ethoxylated 3 bisphenol A Diacrylate, SR-349, were added and mixed in well.
4. Optionally, 3 parts of a mixture of photochromic dyes can be mixed in to the solution.
5. Next, 10.00 parts of dipentaerythritol hexaacrylate were added and mixed in well.
6. 30.00 parts CN2259, a polyester acrylate oligomer were added and mixed well
7. 40.00 parts of CN991, an aliphatic polyester urethane Diacrylate were added and mixed well.
8. 1 part of tert-butyl peroxybenzoate was added and mixed well
9. The solution is now ready for use or should be refrigerated for use at a later time.

EXAMPLE #4

1. 10.00 parts of isobornyl acrylate were added to an appropriate container.
2. 0.30 parts of cobalt naphthenate were then added to the isobornyl acrylate and mixed well until completely dissolved.

3. Next, 5.70 parts of an ethoxylated 3 bisphenol A Diacrylate, SR-349, were added and mixed in well.
4. Optionally, 3 parts of a mixture of photochromic dyes can be mixed in to the solution.
5. Next, 10.00 parts of dipentaerythritol hexaacrylate were added and mixed in well.
6. 40.00 parts CN2259, a polyester acrylate oligomer were added and mixed well
7. 30.00 parts of CN991, an aliphatic polyester urethane Diacrylate were added and mixed well.
8. 1 part of tert-butyl peroxybenzoate was added and mixed well
9. The solution is now ready for use or should be refrigerated for use at a later time.

Solvent Resistance:

|  | Example # | | | |
|---|---|---|---|---|
|  | 1* | 2 | 3 | 4 |
| Acetone (R.T.) | POOR | GOOD | GOOD | GOOD |
| NMP (65C) | POOR | GOOD | GOOD | GOOD |

Photochromic Response:

|  | Example # | | | |
|---|---|---|---|---|
|  | 1* | 2 | 3 | 4 |
| % T initial | Not Tested | 78% | 79% | 78% |
| % T Dark | Not Tested | 15% | 22% | 16% |

*NOTE:
Example #1 does not contain any dipentaerythritol hexaacrylate used for solvent resistance and contains over 10% of the epoxy novolac modified bisphenol A epoxy which has very poor solvent resistance characteristics.

Examples 5 through 8 were blended in the same manner as the previous four examples. These examples also include the use of a surfactant, EFKA 3034, to assist in spreading. The addition of 1-2 percent EFKA would make up the difference between the total weight shown and 100%.

EFKA 3034 is the trade name for fluorocarbon containing organically modified polysiloxane available from Ciba Specialty Chemicals, Inc. of Tarrytown, N.Y. Some of its properties are as follows: Solvent of methoxypropanol; Density of 0.97 to 0.99 g/cm$^3$ @ 20 degrees Celsius; Refractive Index of 1.422 to 1.432; and a Flash Point of 32 degrees Celsius.

Solvent Resistance:

|  | Example # | | | |
|---|---|---|---|---|
|  | 5 | 6 | 7 | 8 |
| Acetone (R.T.) | GOOD | GOOD | GOOD | GOOD |
| NMP (65C) | GOOD | GOOD | GOOD | GOOD |

Photochromic Response:

|  | Example # | | | |
|---|---|---|---|---|
|  | 5 | 6 | 7 | 8 |
| % T initial | 77% | 80% | 84% | 88% |
| % T Dark | 21% | 29% | 41% | 25% |

Solvent Resistance:

The formulations needed to be resistant to aggressive cleaning solvents and solvents that could be used in the process to incorporate the photochromic dyes. Each coating was subjected to acetone at room temperature and also to n-methyl-pyrolidone (NMP) heated to 65 degrees Celsius for one (1) minute. The results are outlined in the table below:

EXAMPLE 9

1. 0.2 phm Cobalt-naphthenate (Aldrich, 6% Co in mineral spirits) was placed in a vial.
2. Next, 20.0 parts of SR340 (2-phenoxethyl methacrylate) is added and warmed.
This is lightly shaken until the cobalt dissolves.
3. Next, 30 parts NS-140 (proprietary bisphenol-A diacrylate) was added and mixed
4. 20 parts of SR399 (di-pentaerythritol pentaacrylate) were then added.
5. 30 parts CN965 (Aliphatic polyester urethane diacrylate) was added and the mixture was cooled to ~50 C
6. Finally, 1 phm Luperox P (t-butylperoxy benzoate) was added and the coating was mixed well.
7. The vial is attached to a vacuum pump to degas and remove any bubbles.

In Example 9 the formulation was applied to the lens and cured to form an imbibable surface. In a subsequent process, photochromic dye was dissolved in a suitable solvent. Imbibing occurs by bringing the photochromic dye solution into contact with the segmented lens surface. During the contacting step, heat may optionally be introduced. The segmented lens can be imbibed with a variety of photochromic dyes, for example, naphthopyrans, fulgides, benzopyrans, fulgimides, spironaphthopyrans, spirobenzoxazines, spironaphthoxazines, spirobenzopyrans, and combinations. The dyes can be blended to achieve different performance or cosmetic characteristics. After a predetermined contact time, the solvent is allowed to evaporate, leaving a photochromic segmented lens. Optionally, heat may be introduced during evaporation.

In the remaining examples, 100% of the formulation is based on a blend of four acrylates. The additional ingredients are then measured on a phm scale. That is, phm is parts per hundred parts of monomer.

Examples 10 through 12 were prepared in the same manner as in Example 9, except that photochromic material (3 phm) was dissolved in the SR340 at ~60 C. Additionally, CN2300, CN2301 or CN2302 hyperbranched polyester acrylate dendrimer was used in place of NS 140.

Solvent Resistance:

|  | Example # | | | |
|---|---|---|---|---|
|  | 9 | 10 | 11 | 12 |
| Acetone (R.T.) | GOOD | GOOD | GOOD | GOOD |
| NMP (65C) | GOOD | GOOD | GOOD | GOOD |

Photochromic Response:

| | Example # | | | |
|---|---|---|---|---|
| | 9 | 10 | 11 | 12 |
| % T initial | 77% | 74% | 78% | 79% |
| % T Dark | 23% | 16% | 21% | 32% |

Examples 13 through 16 were prepared in the same manner as in Example 9, except that SR348, CD540, CD541 or CD542 ethoxylated bisphenol-A di-methacrylates were used in place of NS140.

Solvent Resistance:

| | Example # | | | |
|---|---|---|---|---|
| | 13 | 14 | 15 | 16 |
| Acetone (R.T.) | GOOD | GOOD | GOOD | GOOD |
| NMP (65C) | GOOD | GOOD | GOOD | GOOD |

Photochromic Response:

| | Example # | | | |
|---|---|---|---|---|
| | 13 | 14 | 15 | 16 |
| % T initial | 76% | 76% | 76% | 75% |
| % T Dark | 24% | 24% | 22% | 20% |

Examples 17 through 20 were prepared in the same manner as in Example 9, except that SR259, SR603, SR252 or SR740 polyethylene glycol di-methacrylates were used in place of NS140.

Solvent Resistance:

| | Example # | | | |
|---|---|---|---|---|
| | 17 | 18 | 19 | 20 |
| Acetone (R.T.) | GOOD | GOOD | GOOD | *** |
| NMP(65C) | GOOD | GOOD | GOOD | *** |

Photochromic Response:

| | Example # | | | |
|---|---|---|---|---|
| | 17 | 18 | 19 | 20 |
| % T initial | 77% | 78% | 77% | *** |
| % T Dark | 24% | 20% | 20% | *** |

*** The solution turned cloudy when SR740 was added (sample was discarded)

In conclusion, we have provided a combination of common and movable molds, along with a process and coating formulations to provide overmolded bifocal lenses with excellent photochromic properties. The SV and segmented lens molds allows various equipment configurations which can be important when manufacturing a range of lenses of different sizes or powers. The coatings according to the invention have a good range of materials that are selectable by class and also weight and phm range. This allows engineers a greater range of flexibility in determining process parameters and compatibility, e.g. with substrate resins and mold surfaces. The coating formulation works equally well as a photochromic overmold coating or as an imbibable surface to be photochromically dyed separate from the overmolding process. Either way the coating can effectively host one dye or a blend of photochromic dyes. The various techniques disclosed herein solve a longstanding need to provide even darkening in segmented lenses, particularly at the surface discontinuity. The photochromic performance is high with a % T initial in the range of 75 to 88% and a % T dark in the range of 15 to 41%.

Having described preferred embodiments for lens manufacturing, materials used therein and methods for processing the same (which are intended to be illustrative and not limiting), it is noted that modifications and variations can be made by persons skilled in the art in light of the above teachings. It is therefore understood that changes may be made in the particular embodiments of the invention disclosed which are within the scope and spirit of the invention as outlined by the appended claims. Having thus described the invention with the details and particularity required by the patent laws, what is claimed and desired protected by Letters Patent is set forth in the appended claims.

What is claimed is:

1. A method for forming a photochromically-enabled bifocal overmold layer on an optical lens injection molding machine having a vertical equipment axis, comprising the steps of:
   injecting molten thermoplastic resin into an edge-gated lens-forming cavity, opening the mold at a time when a single vision (SV) lens is rigid enough to maintain its shape while being retained on the lower mold half, and swapping out the SV upper mold half;
   swapping in a bifocal upper mold half having a base curve closely matched to the SV lens;
   depositing an unpressurized full metered charge of a photochromically-enabled thermoset composition on to the upwardly-facing convex surface of the SV lens; and
   clamping the bifocal upper mold half to the lower mold half, whereby the thermoset composition is thermally cured by the heat from the mold and the residual heat from the thermoplastic lens to form a photochromically-enabled bifocal shaped overmold lens that is intimately formed on the thermoplastic SV lens.

2. The method of claim 1, wherein said depositing step occurs simultaneously with one of said swapping steps and includes a thermoset composition having two different functional types of acrylates.

3. The method of claim 2, wherein said swapping steps each include a horizontal translation of the respective upper mold halves.

4. The method of claim 1, wherein
   said photochromically-enabled bifocal overmold contains a (meth)acrylate and a metal salt.

5. The method of claim 1, wherein said injecting step comprises injecting molten resin through a receiver that (i) surrounds an exchangeable SV lens forming insert that can be height adjusted below the parting line in a direction parallel to the vertical equipment axis and (ii) includes a bore for an ejector pin that reciprocates parallel to the vertical equipment axis.

6. The method of claim 4, wherein following said clamping step the method further includes:

retracting the bifocal upper mold half after the thermoset composition is at least partially thermally cured, and sliding the ejector pin parallel to the vertical equipment axis to release the lens from the lower mold half.

7. The method of claim 1, wherein the thermoset composition contains about 1% to 5% by weight of a photochromic dye, wherein a resulting segmented lens has good solvent resistance, a % T initial of at least 75% and a % T dark in the range of about 15 to 40%.

8. The method of claim 6, wherein the thermoset composition contains an imbibable material, and wherein after the lens is released from the lower mold half, the bifocal overmold layer is contacted with a solution containing a photochromic dye.

9. The method of claim 1, wherein the thermoset composition comprises:
   (1) a monofunctional (meth)acrylate;
   (2) a multifunctional (meth)acrylate;
   (3) a metal salt;
   (4) an initiator; and
   (5) at least one further compound selected from the group consisting of:
      a. a difunctional meth(acrylate);
      b. a polyester acrylate oligomer;
      c. an epoxy modified bisphenol A epoxy; and
      d. an aliphatic urethane diacrylate.

10. The method of claim 9, further comprising a surfactant.

11. The method of claim 9, further comprising a photochromic dye.

12. The method of claim 11, wherein the photochromic dye is present in an amount between about 1% to 5% by weight.

13. The method of claim 9, further including a photochromic dye present in an amount of about 3% by weight.

14. The method of claim 9, wherein the thermoset composition comprises:
   (1) a monofunctional (meth)acrylate;
   (2) a multifunctional (meth)acrylate selected from the group consisting of a multifunctional hexaacrylate, a multifunctional pentaacrylate, and combinations thereof;
   (3) a metal salt;
   (4) an initiator;
   (5) a difunctional (meth)acrylate; and
   (6) an aliphatic urethane diacrylate.

15. The method of claim 9, wherein the thermoset composition comprising:
   (1) a monofunctional (meth)acrylate;
   (2) a multifunctional (meth)acrylate comprising a multifunctional hexaacrylate;
   (3) a metal salt;
   (4) an initiator;
   (5) a difunctional (meth)acrylate;
   (6) a polyester acrylate oligomer; and
   (7) an aliphatic urethane diacrylate comprising an aliphatic polyester based urethane oligomer.

16. The method of claim 9, wherein the thermoset composition comprising:
   (1) a monofunctional (meth)acrylate;
   (2) a multifunctional (meth)acrylate comprising a multifunctional pentaacrylate;
   (3) a metal salt;
   (4) an initiator;
   (5) a polyester acrylate oligomer; and
   (6) an aliphatic urethane diacrylate comprising an aliphatic polyester based urethane oligomer.

17. The method of claim 9, wherein the thermoset composition comprises a first monofunctional (meth)acrylate and a second monofunctional (meth)acrylate different from said first monofunctional (meth)acrylate.

18. The method of claim 9, wherein the thermoset composition comprises a first aliphatic urethane diacrylate and a second aliphatic urethane diacrylate different from the first aliphatic urethane diacrylate.

19. The method of claim 9, wherein the monofunctional (meth)acrylate is selected from the group consisting of an isobornyl acrylate, a hydroxypropyl methacrylate, a 2-phenoxyethyl methacrylate, and combinations thereof.

20. The method of claim 9, wherein the multifunctional (meth)acrylate is selected from the group consisting of a dipentaerythritol hexaacrylate, a dipentaerythritol pentaacrylate, a hexafunctional aliphatic urethane acrylate and combinations thereof.

21. The method of claim 9, wherein the difunctional (meth)acrylate is selected from the group consisting of a 1,6-hexanediol diacrylate, an ethoxylated bisphenol A di(meth)acrylate, a polyethylene glycol di(meth)acrylate and combinations thereof.

22. The method of claim 9, wherein
   (1) the monofunctional (meth)acrylate is present in an amount of about 1% to 40% by weight;
   (2) the multifunctional (meth)acrylate is present in an amount of about 1% to 50% by weight;
   (3) the metal salt is present in an amount of about 0.05 to 2.0 phm; and
   (4) the initiator is present in an amount of about 0.1 to 5.0 phm.

23. The method of claim 9, wherein
   the monofunctional (meth)acrylate is present in an amount of about 10 to 20% by weight; and
   the multifunctional (meth)acrylate is present in an amount of about 10 to 35% by weight.

24. The method of claim 22, wherein the difunctional meth (acrylate) is present in an amount of about 0% to 50% by weight.

25. The method of claim 22, wherein the difunctional meth (acrylate) is present in an amount of about 5% to 35% by weight.

26. The method of claim 22, wherein the polyester acrylate oligomer is present in an amount of about 0% to 50% by weight.

27. The method of claim 22, wherein the polyester acrylate oligomer is present in an amount of about 20% to 40% by weight.

28. The method of claim 22, wherein the epoxy modified bisphenol A epoxy is present in an amount of about 0% to 20% by weight.

29. The method of claim 22, wherein the aliphatic urethane diacrylate is present in an amount of about 0% to 60% by weight.

30. The method of claim 22, wherein the aliphatic urethane diacrylate is present in an amount of about 30% to 50% by weight.

31. The method of claim 9, wherein the metal salt is cobalt naphthenate.

32. The method of claim 9, wherein the initiator is tert-butylperoxybenzoate.

* * * * *

UNITED STATES PATENT AND TRADEMARK OFFICE
CERTIFICATE OF CORRECTION

PATENT NO. : 7,820,082 B2  
APPLICATION NO. : 11/820752  
DATED : October 26, 2010  
INVENTOR(S) : Ronald Berzon et al.

Page 1 of 1

It is certified that error appears in the above-identified patent and that said Letters Patent is hereby corrected as shown below:

Column 1, delete lines 21-30;

Column 3, line 35, after "half" insert a --.--;

Column 8, line 47, following "or" delete "dipentaeytlhritol" and insert --dipentaerythritol--;

Column 18, line 11, following "Pa" delete "®" and insert --@--;

line 13, before "8402" delete "&"; and

Column 21, line 46, delete "$^{20}$" and insert --20--.

Signed and Sealed this  
Eighth Day of March, 2011

David J. Kappos  
*Director of the United States Patent and Trademark Office*

UNITED STATES PATENT AND TRADEMARK OFFICE
CERTIFICATE OF CORRECTION

PATENT NO. : 7,820,082 B2
APPLICATION NO. : 11/820752
DATED : October 26, 2010
INVENTOR(S) : Ronald Berzon et al.

Page 1 of 1

It is certified that error appears in the above-identified patent and that said Letters Patent is hereby corrected as shown below:

On the title page, item (73), line 1, delete "Compagne" and insert --Compagnie--;

line 2, delete "Paris" and insert --Charenton--.

Signed and Sealed this
Fourteenth Day of June, 2011

David J. Kappos
*Director of the United States Patent and Trademark Office*